United States Patent [19]

Kretzinger

[11] Patent Number: 4,993,223
[45] Date of Patent: Feb. 19, 1991

[54] ANNULAR RECUPERATOR

[75] Inventor: Karl F. Kretzinger, Simi Valley, Calif.

[73] Assignee: Allied-Signal Inc., Morris Township, Morris County, N.J.

[21] Appl. No.: 405,366

[22] Filed: Sep. 11, 1989

[51] Int. Cl.[5] .............................................. F02C 7/10
[52] U.S. Cl. .................................. 60/39.511; 165/166
[58] Field of Search ..................... 60/39.511; 165/166, 165/167

[56] References Cited

U.S. PATENT DOCUMENTS

| | | | |
|---|---|---|---|
| 3,228,464 | 1/1966 | Stein et al. | 165/166 |
| 3,285,326 | 11/1966 | Wosika | 165/166 |
| 3,322,189 | 5/1967 | Topouzian | 60/39.511 |
| 3,424,240 | 1/1969 | Stein et al. | 165/166 |
| 3,785,435 | 1/1974 | Stein et al. | 165/166 |
| 3,818,984 | 6/1974 | Nakamura et al. | 165/166 |
| 3,831,374 | 8/1924 | Nicita | 165/166 |
| 4,506,502 | 3/1985 | Shapiro | 60/39.511 |

Primary Examiner—Louis J. Casaregola
Attorney, Agent, or Firm—David B. Abel; Terry L. Miller; Robert A. Walsh

[57] ABSTRACT

An annular recuperator for use with a combustion power plant and in particular with a turbine engine. The annular recuperator is constructed from a plurality of stacked formed plates alternately sandwiching radially aligned exhaust passageways with partially radially, partially circumferentially aligned air passageways, in heat exchange relationship. The air passageways containing generally Z shaped finned passageways interconnecting axially aligned inlet and outlet manifolds within the annular core.

17 Claims, 4 Drawing Sheets

ANNULAR RECUPERATOR

BACKGROUND OF THE INVENTION

The present invention relates to a type of heat exchanger known as a recuperator. Recuperators are used in conjunction with various power generating devices to increase the operating efficiency of the system. In general, a recuperator pre-heats air prior to combustion within a gas turbine engine, (for example) in heat exchange relationship with the hot exhaust gases. The present invention is more specifically directed to an annular recuperator for use with a gas turbine engine.

Recuperators are specifically designed and required to operate in extreme environments. The hot pass side of the recuperator is subjected to pressurized combustion exhaust gases and temperatures in excess of 1000° F. Meanwhile, the cold pass side of the recuperator receives ambient or precompressed ambient air at temperatures which may be below 0° F. The potentially destructive combination of high pressure differentials, high thermal differentials, and corrosive combustion products is amplified by thermal cycling and startup/shutdown cycles. Thus, the recuperator must be extremely rugged, while being flexible to accommodate thermal growth and cycling.

A number of the problems associated with the design and construction of industrial flat-plate type recuperators are addressed within U.S. Pat. Nos.: 4,246,959; 4,263,964; 4,291,752; 4,291,754; 4,299,868; 4,331,352; 4,377,02; 4,458,866; and 4,511,106 all of which are currently assigned to the assignee of the present invention.

While a properly designed recuperator increases the efficiency of the power generating system, there are disadvantages associated with their use. Notably, the recuperator back pressurizes the power plant, decreasing its efficiency. Also, recuperators add substantial weight and size, and they are potentially subject to failure, causing downtime for the power generating system. For mobile applications, such as within ships and land vehicles, the added weight and size considerations become extremely important, and may determine whether the added efficiency of the system is justified.

SUMMARY OF THE INVENTION

The present invention provides an annular recuperator constructed from a plurality of generally circular plates having formed edges, and heat transfer fins placed in passageways between the circular plates. Alternate air and gas flow passages are separated by the plates when the plates and heat transfer fins are assembled and brazed. Each of the plates includes a plurality of spaced apart, generally triangular holes which align to form air inlet and outlet manifolds axially aligned within the recuperator core. The air flows axially into the recuperator core through the generally triangular inlet manifolds. The inlet manifolds distribute the air to a plurality of air flow passageways, which include generally Z-shaped heat exchange fins which direct the air flow to adjacent outlet manifolds. The now heated air then flows axially through the outlet manifolds and out of the recuperator core. Meanwhile, hot combustion gases from the turbine engine are distributed within a cylindrical volume inside the annular recuperator. The combustion gases flow radially outward through a plurality of gas passageways within the core. The gas passageways are bounded by successive air inlet and outlet manifolds and by adjacent plates. Thereby, the gas passageways are configured to have approximately constant cross-sectional areas.

The annular recuperator is designed for high heat transfer efficiency. Heat is transferred from the hot exhaust to the colder compressor air through the use of offset fins. These offset fins conduct heat efficiently with minimum pressure loss. The annular recuperator assembly thereby provides engine performance benefits primarily as a reduction in fuel consumption. These improvements in overall engine performance are provided by the annular recuperator heat transfer effectiveness, while the weight and pressure drop across the recuperator are minimized.

DETAILED DESCRIPTION OF THE PREFERRED EMBODIMENT

Figure 1:
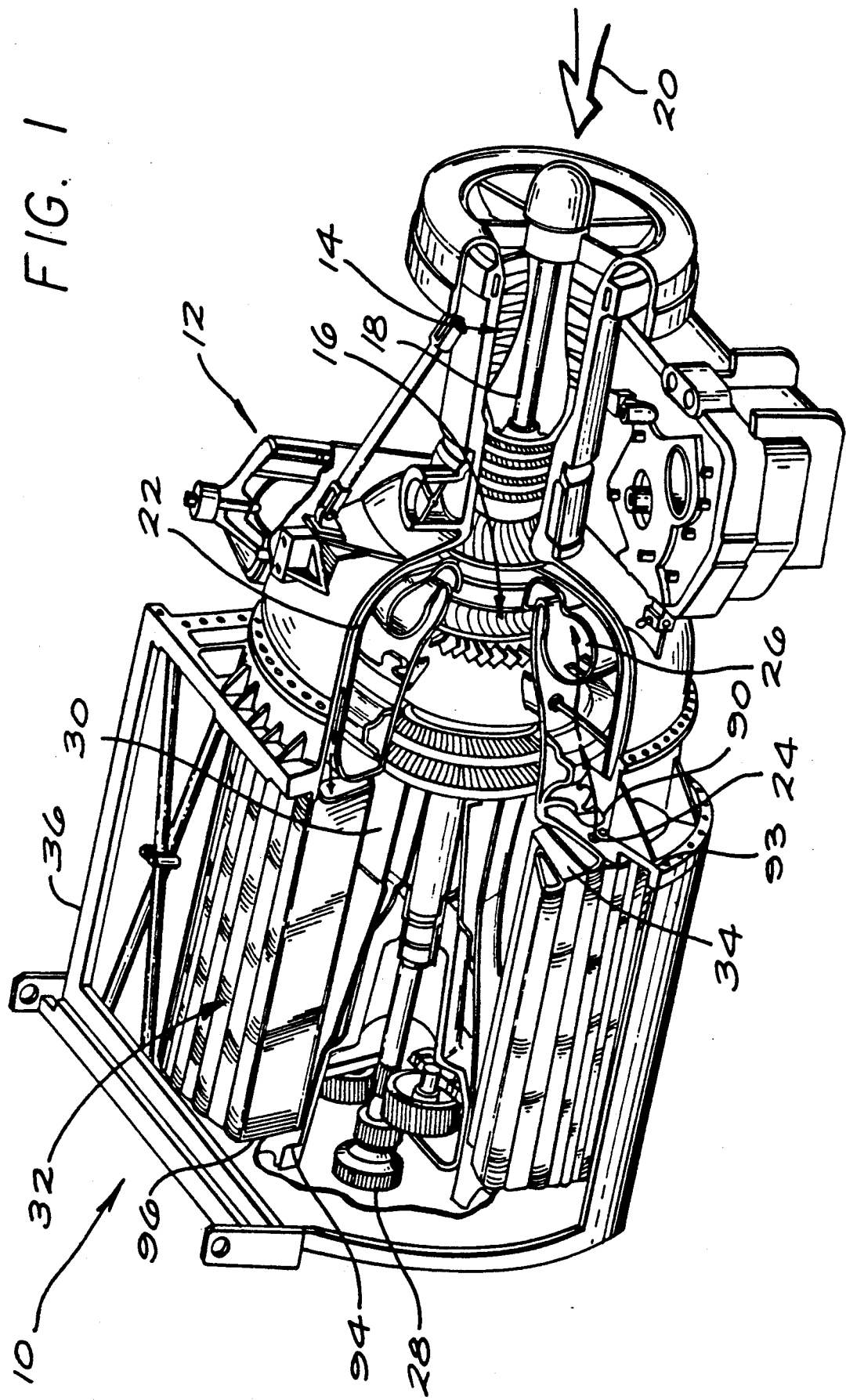
FIG. 1 shows a schematic, partially cutaway view of an annular recuperator attached to a gas turbine engine.

FIG. 1 schematically depicts a cutaway view of an annular recuperator 10 attached to a gas turbine engine 12. The engine 12 includes a multistage compressor section 14 rotatably driven by a multistage turbine section 16 via shaft 18. Ambient air is drawn into the compressor section 14 as depicted by arrow 20. Compressed air exiting the compressor section 14 is conducted via duct 22 to the annular recuperator 10, wherein it is heated by the engine exhaust gases. The heated, compressed air from the annular recuperator 10 is then conducted via duct 24 to a combustor 26 of the turbine engine 12. Within the combustor 26, the heated, compressed air is mixed with fuel from a fuel tank (not shown) and combusted, producing hot motive combustion gases. These hot gases are directed upon the turbine section 16 of the engine 12 producing rotational output power via the shaft 18. A portion of this output power is required to rotationally drive the compressor section 14, while the majority remainder is available as driving output shaft power. The driving output shaft power may be used to drive a generator, compressor, propeller or vehicle (not shown) through gear box 28. The exhaust gases exiting the turbine section 16 enter an annular chamber 30 within the interior of the annular core 32 of the recuperator 10. Therein, the exhaust gases are distributed to a plurality of radially extending exhaust gas passageways 34, described in more detail below, within the annular core 32. After exiting the annular core 32, the exhaust gases are conducted through exhaust gas manifold 36, and an exhaust conduit (not shown) to the atmosphere.

Figure 2:
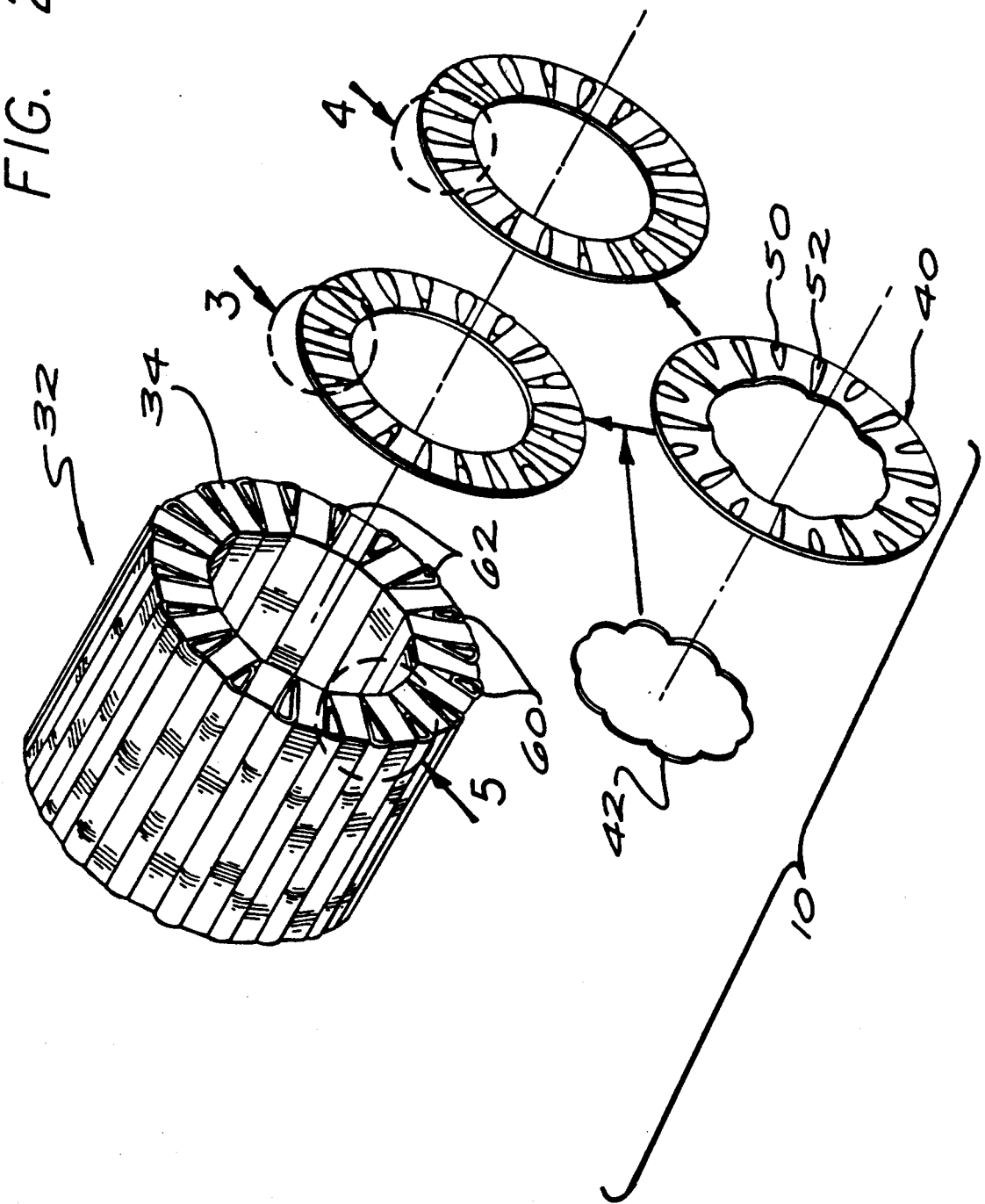
FIG. 2 shows a perspective, partially exploded view of the recuperator core.

FIGS. 2–5 depict more detailed views of the annular core 32 of the recuperator 10. FIG. 2 shows a perspective view of an assembled annular core 32, as well as a partially exploded schematic view of the major components of the annular core 32. The annular core 32 is constructed entirely from a plurality of five mass producible components. These components include generally disk shaped plates 40, support rings 42, generally rectangular exhaust passageway fin elements 44, triangular fin elements 46, and parallelogrammatical fin elements 48.

Each plate 40 includes a first plurality of generally triangularly shaped inlet passageways 50 alternately arranged in paired sets with a second plurality of generally triangularly shaped outlet passageways 52, formed therein. The edges of the inlet and outlet passageways 50, 52 are stamped to include border ridges 54, 56, respectfully, thereabout. The ridges 54, 56 may extend a height equal to the spacing between adjacent plates 40 upon assembly, or a fraction thereof. Preferably, the ridges 54, 56 extend a height equal to one half of the spacing between adjacent plates 40. When the plates 40 are assembled, the inlet passageways 50 align and define a plurality of compressed air inlet manifold 60. Similarly, the outlet passageways 52 align to define a plurality of air outlet manifolds 62. As may be readily appreciated, the heating of the air within the core 32 results in expansion of the air. Thus, the outlet passageways 52 and manifolds 62 have a larger cross-sectional area then do the inlet passageways 50 and manifolds 60, to prevent excessive back pressurizing of the compressor section 14.

Figure 3:
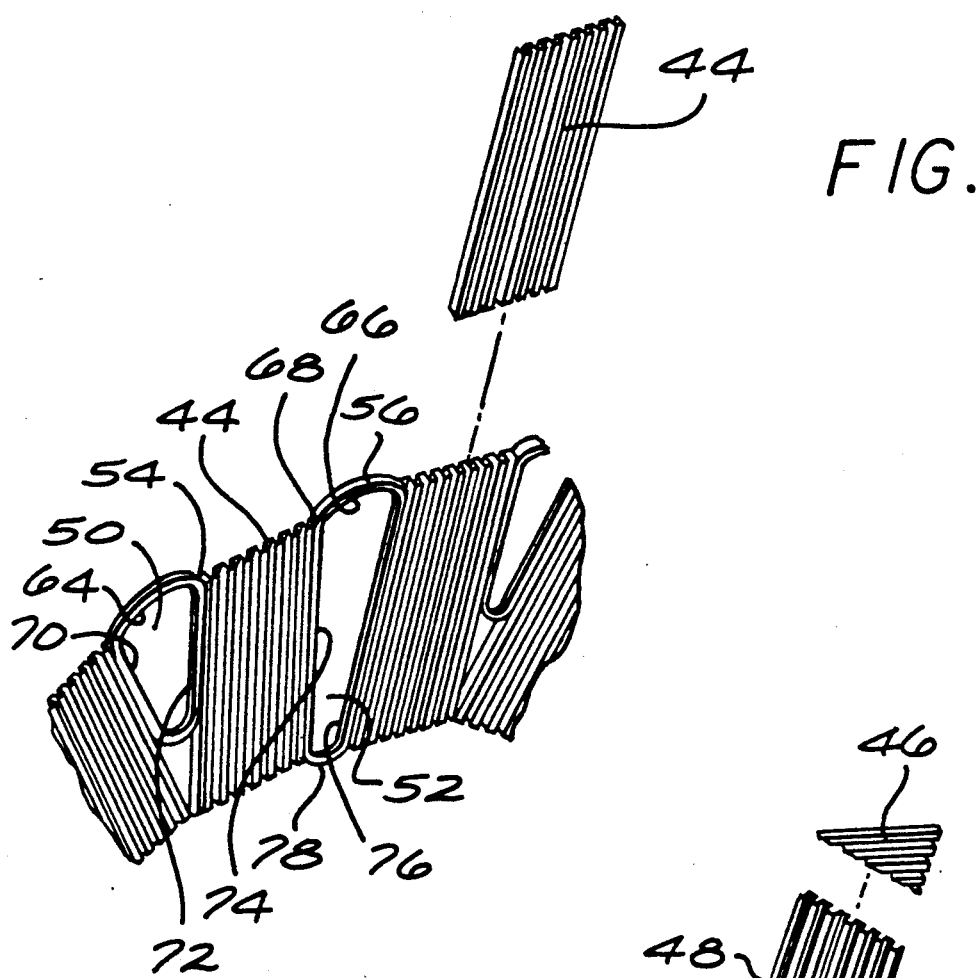
FIG. 3 shows an enlarged partial view of the portion of the recuperator core enclosed by circle 3 within FIG. 2.

FIG. 3 shows a partial, exploded view of adjacent exhaust gas passageways 34 identified by circle 3 within FIG. 2. The exhaust gas passageways 34 are generally rectangularly shaped and disposed between adjacent inlet and outlet passageways 50, 52. A corrugated sheet of exhaust passageway fin elements 44 is inserted within the passageway 34, to turbulate the exhaust gas flow and promote heat transfer to the plates 40. Ridges 54 and 56 prevent the exhaust gases from mixing with the air within manifolds 60 and 62. Thus, the exhaust gases flow radially out through the annular core 32 within the exhaust gas passageways 34, transferring heat to the exhaust passageway fin elements 44. Since the passageways 34 are generally rectangular in shape, the cross-sectional area through which the exhaust gases flow can be made essentially constant. Alternatively, since cooling of the exhaust gases occurs as they flow out through the core, the exhaust gas passageways 34 may be designed for constant pressure radial flow of the exhaust gases by forming the passageways 34 and fin elements 44 in the shape of a trapezoid, the sides of which converge radially outward. This is readily accomplished by adjusting the shape of the adjacent passageways 50 and 52.

Figure 4:
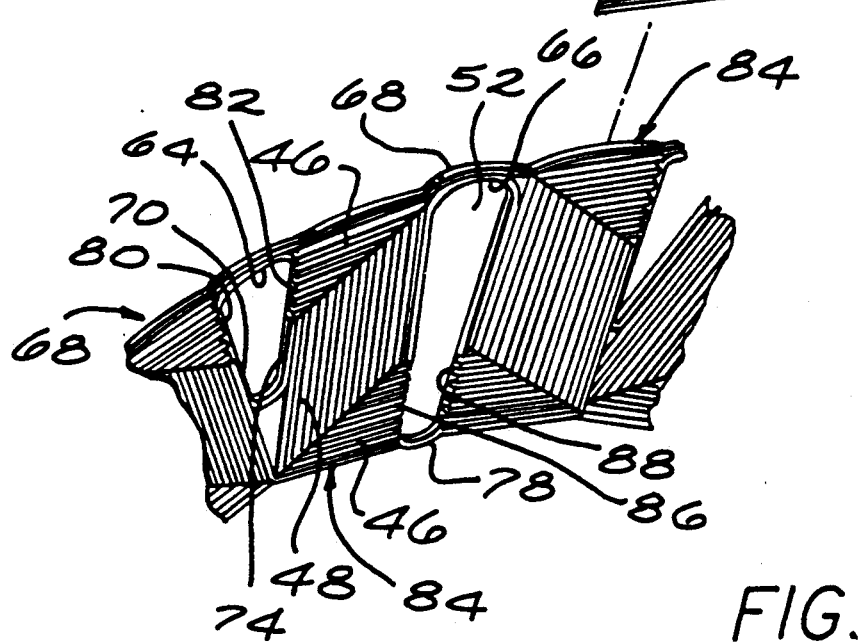
FIG. 4 shows an enlarged partial view of the portion of the recuperator core enclosed by circle 4 within FIG. 2.

FIG. 4 shows a partial, exploded view of the compressed air flow path identified by circle 4 within FIG. 2. Compressed air flows axially into the annular core 32 through the inlet manifolds 60 defined by inlet passageways 50 within each disk plate 40. As described earlier, the inlet and outlet passageways 50, 52 are generally triangularly shaped. Preferably, however, all of the corners of the triangular shape are radiused, thereby allowing for thermal expansion and reducing stress concentration. The triangles are arranged with one side 64, 66 respectively generally aligned with the outer edge or circumference 68 of the core 32. Sides 64, 66 are preferably slightly curvilinear, the radius being less than the radius of the annular core, thereby forming a bump or curved edge at the radially outer edge of the core. This curved edge allows thermal growth of the core without failure induced by stress. The remaining two sides of the triangles 70, 72 and 74, 76 for the inlet and outlet passageways 50, 52 respectively, converge radially inward toward the inner edge 78 of the annular core 32. The radially inward angle of the triangles is also curvalinear, allowing thermal growth without stress induced failure.

Gaps or openings 80, 82 within the radially outer section of ridges 54 surrounding inlet passageways 50 allow the compressed air to enter a generally rectangular area 84 between adjacent inlet and outlet passageways 50 and 52. Rectangular areas 84 are oppositely disposed relative to the exhaust gas passageways 34, separated by the disk plates 40. A second set of openings 86, 88 within the radially inner portions of ridges 56 surrounding outlet passageways 52 also communicate with and receive compressed air from the rectangular areas 84.

In order to promote heat transfer to the compressed air, the parallelogrammatical fin elements 48 and a pair of triangular fin elements 46 are disposed within the rectangular areas 84. The fin elements 48 and 46 are arranged to provide a plurality of generally Z (or backward Z) shaped passages between the openings 80, 82 of inlet passageways 50 and openings 86, 88 of outlet passageways 52. The triangular fin elements 46 define the top and base of the Z and have fin corrugations which are generally circumferentially aligned, while the parallelogrammatically shaped fin elements 48 define the central portion of the Z, and have fin corrugations which are generally radially aligned.

The support rings 42 are assembled into the annular core 32 at the inner diameter of the disk plates 40. These support rings provide additional structural support to the core 32 at the hottest area. Preferably, the support rings are made from a different material then that of the plates 40, thus having a different thermal coefficient of expansion. This difference may be utilized to prestress the inner diameter of plates 40 during a brazing or sintering process, to reduce thermal expansion induced failures during cyclic operation.

To form a stainless steel annular core 32, blanks for the disk shaped plates 40 are cut from a first sheet of stainless steel. The blanks are then stamped to form the ridges 54, 56 about the inlet and outlet passageways, as well as to displace the outer edge 68 and inner edge 78 of each plate 40 from the plate of the plate 40. The fin elements are all formed from a second sheet of stainless steel which is first corrugated as a sheet. Then the sheets are cut to the desired shapes, preferably by a laser or wire cutting operation. Each of the plates and fin elements may then be coated with a brazing compound prior to assembly. When the assembled core 32 is subsequently heated, the brazing compound interbonds all adjacent surfaces.

To form the pluralities of individual components into the annular core 32, the formed disk plates 40 are repetitively stacked to alternately sandwich the exhaust passageway fins and the air passageway fins 46, 48 between successive disk plates 40. The support rings 42 are also included int he stacked array. Once a plurality of the disks 40 have been so arranged into a stacked array, the annular core 32 may be dipped in liquefied brazing material, then brazed within a furnace to bond all adjacent surfaces, forming a metallurgically bonded, honeycomb like monolithic core structure, that is very strong, yet internally resilient. Air transition ducts 90, flanges 93, mount plate 94, and bladder 96 (FIG. 1) are welded to the core to form the complete recuperator. The resulting structure can accommodate large thermally induced temperature gradients, and provide long service life performance. Because of its high strength-to-weight ratio and the distribution of externally applied loads throughout the core 32, environmentally induced stresses resulting from vibration and shick are readily accommodated. The matrix also provides for the efficient transfer of heat from the to gas to the colder compressor air.

Figure 5:
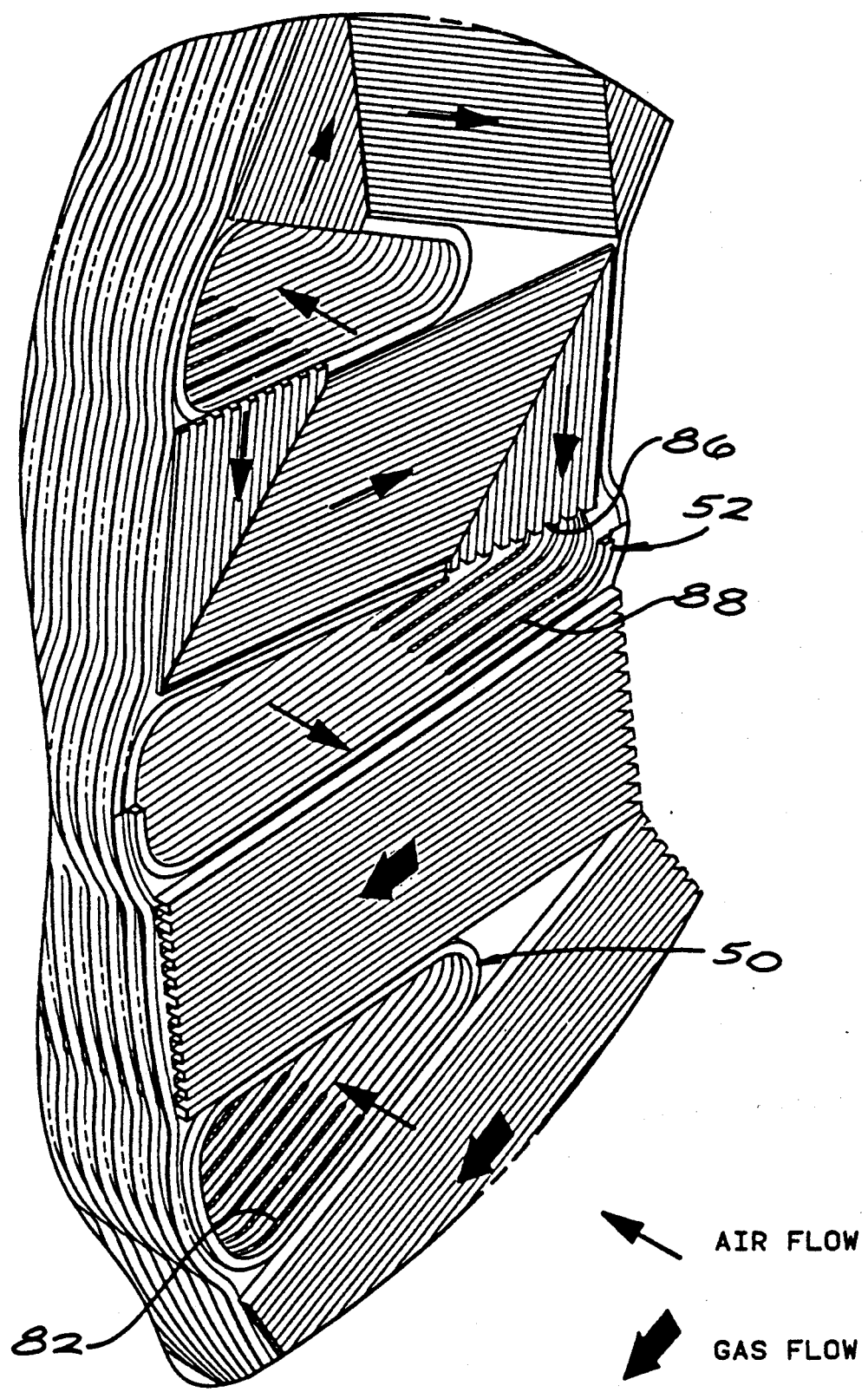
FIG. 5 shows an enlarged, partially cutaway view of a portion of the recuperator core enclosed by circle 5 within FIG. 2.

The compressed air and exhaust gas flow patterns are further illustrated in FIG. 5. Air flows axially (perpendicular to the plane of the paper) through each air inlet manifold 60, and then enters each individual rectangular area 84 through a triangular crossflow inlet end section. The air turns and flows axially inward through a counterflow section, turns into a triangular crossflow exit section, and exits into the air outlet manifold 62. Meanwhile, the exhaust gas flows radially outward straight through the exhaust gas passageways 32 on the opposite sides of the plates 40 from the air flow.

The recuperator material is preferably 14-percent chromium, 4-percent molydenum (14 Cr-4 Mo) stainless steel, brazed with a nickel chromium alloy. Alternatively, the recuperator may be formed from ceramics such as silicon nitride or silicon carbide, which would be similarly formed into the desired shapes while in a green state, assembled into a core stack, and sintered to form a monolithic ceramic annular core 12.

The recuperator mounting system is a pressure-balanced arrangement that limits and controls longitudinal pressure loads and structural loads on the unit. The recuperator assembly 10 including the annular air pressure chamber 30, is flexible to accommodate longitudinal thermal deformations. The rear mounting plate 94 with the support ring is one wall of the recuperator, and the side plate of the recuperator core 32 is the opposing wall. Flexible connections at the inner and outer diameters of the two walls complete the chamber 30. Internal to the chamber 30 are localized radial support tangs welded to the mounting plate. The tangs, in turn, engage reinforced slots in the side plate. Unrestrained longitudinal and radial thermal deformations of the heat exchanger elements are possible, as relative motion occurs between the tangs and slots. Because slots are located at each air inlet manifold, the recuperator is firmly supported at the rear end for all loads normal to the centerline.

The size of the annular chamber 30 is established to balance the associated pressure, and to obtain a longitudinal net compression loading on the recuperator core 32 as air pressure from the inlet ducts 22 on the side plate and also seats the rear mounting plate against the rear header. This mounting arrangement results in positive structural support for the annular recuperator assembly, with flexibility, or softness, that will isolate the unit and avoid the sharing of engine housing structural loads, which could damage the recuperator 10.

Potential leakage between the air stream and the gas side stream is always a probability. These potential leakages occur for a variety of conditions, both operating and non-operating. The use of stainless-steel, plate-fin, chrome-nickel-brazed heat exchanger elements offers a recuperator design that is fully repairable at the intermediate maintenance level. Causes of localized leakage can be rapidly repaired with effective return of the assembly into service.

In addition to providing full interchangeability with increased durability and serviceability at the intermediate maintenance level, the recuperator 10 provides high thermal effectiveness and low pressure drop. Compared with full rated power output, the nominal installed effectiveness of the system is 77.4 percent and the corresponding pressure loss is 9.0 percent.

In one example, based on a 360-hr, 6000-mile mission profile endurance test cycle, the fuel savings for a recuperated turbine engine as opposed to a non-recuperate turbine engine is approximately 6950 lb, or 980 gallons. For the assumed mission, approximately 26 percent of the time (93.6 hr) is at 300 ship horse power (shp), 16 percent of the time (72.0) is at 900 shp, 20 percent of the time (57.6 hr) is at 1200 shp, and 38 percent (136.8 hr) is at 1500 shp. For this test cycle, the recuperator core 32 included twenty very compact offset plated-fin surfaces (37 fins/inches, 0.050 inches high on the air side and 21.5 fins/inches, 0.130 inches high on the gas side). The dimensions of each heat exchanger element, less manifolds, was 2.5 inches wide, 5.1 inches high, and 21.7 inches long and the recuperator core weighs 450 pounds.

Improvements in power plant thermal and noise signatures are also realized with the annular recuperator. The achievement of a higher recuperator thermal effectiveness substantially reduces air exit temperature. This operational temperature difference (or temperature suppression) compared with alternative or non-recuperated designs provides a reduction in thermal signature of the system, which leads to a reduction in the thermal signature. In addition, the annular recuperator has a lower mean gas speed in the assembly, and accordingly is amenable to improving acoustic noise control if necessary.

I claim:

1. A recuperated turbine engine power plant comprising:
   a turbine engine means including compressor, combustor, and turbine sections for ingesting and compressing ambient air, combusting said compressed air with fuel to produce hot gases, and expanding said hot gases to rotationally drive said turbine and produce useful work output; and
   recuperator means for pre-heating said compressed ambient air prior to combustion in heat exchange relationship with said expanded turbine exhaust gases, said recuperator means including an annular core section receiving said combustion gases internally to said annular core said annular core defined by a stacked plurality of generally disk shaped plates, each of said plates including a first plurality of inlet passageways alternately arranged inpaired sets with a second plurality of outlet passageways, each of said passageways bordered at least partially by ridges extending a height of between the spacing between adjacent plates and a fractional portion thereof; said stacked plurality of plates thereby forming a stacked plurality of partially counterflow partially cross-flow plate-fin heat exchange elements wherein said turbine exhaust combustion gases flow radially outward through a generally constant cross-section, finned passageway; and
   means for allowing thermal growth of said stacked plurality of heat exchange elements during repetitive cyclic operation of the power plant.

2. A recuperated turbine engine power plant comprising
   a turbine engine means including compressor, combustor, and turbine sections for ingesting and compressing ambient air, combusting said compressed air with fuel to produce hot gases, and expanding said hot gases to rotationally drive said turbine and produce useful work output;

recuperator means for pre-heating said compressed ambient air prior to combustion in heat exchange relationship with said expanded turbine exhaust gases, said recuperator means including an annular core section receiving said combustion gases internally to said annular core, said annular core defined by a stacked plurality of generally disk shaped plates, each of said plates including a first plurality of generally triangularly shaped inlet passageways alternately arranged in paired stets with a second plurality of generally triangularly shaped outlet passageways, each of said passageways bordered at least partially by ridges extending a height of between the spacing between adjacent plates and a fractional portion thereof, said stacked plurality of plates thereby forming a stacked plurality of partially counter-flow partially cross-flow plate-fin heat exchange elements wherein said turbine exhaust combustion gases flow radially outward through generally constant cross-section, finned passageways;

a plurality of generally rectangular exhaust fin elements, said exhaust fin elements disposed between alternate pairs of said stacked plurality of plated within the spaces defined by said paired adjacent inlet and outlet passageways;

a plurality of in elements defining generally Z-shaped fin passageways alternately stacked with respect to said exhaust fin elements between alternate pairs of said stacked plurality of plates;

a first plurality of openings within said ridges bordering said inlet passageways of said plates, said first openings communicating with said Z-shaped finned passageways between alternate pairs of said stacked plurality of plates to distribute air thereto; and a second plurality of openings within said ridges bordering said outlet passageways of said plates, said second openings communicating with said Z-shaped finned passageways between alternate pairs of said stacked plurality of plates to receive air therefrom.

3. The recuperated engine of claim 2 wherein said fin elements defining said Z-shaped finned passageways comprise:

a plurality of generally triangular shaped finned elements; and a plurality of generally parallelogrammatically shaped finned elements, one of said parallelogrammatically shaped finned elements being disposed between adjacent of said inlet and outlet passageways and having a plurality of radially aligned corrugations forming fins, a pair of said triangular shaped fins also disposed between said inlet and outlet passageways radially inward and radially outward of said parallelogrammatical finned elements, said triangular finned elements having corrugations aligned generally tangential to said radius of said annular core.

4. The recuperated engine of claim 2 wherein said plurality of outlet passageways within said plates of said core have a greater cross-sectional area then said inlet passageways.

5. The recuperated engine of claim 2 wherein said plurality of inlet passageways within said plurality of plates are aligned to define inlet manifolds and said plurality of outlet passageways align to define a plurality of outlet manifolds, said inlet and said outlet manifolds thereby being axially aligned within said annular core.

6. The recuperated engine of claim 5 wherein said plates, said exhaust fin elements, said triangular shaped fin elements, and said parallelogrammatical fin elements are assembled and interbonded to form a solid monolithic annular core.

7. The recuperated engine of claim 2 wherein said generally triangular inlet and outlet passageways have radiused corners.

8. The recuperated engine of claim 7 wherein one side of said generally triangular inlet and outlet passageways is generally aligned with the outer circumference of the core, said side additionally being curvalinear and having a radius less than the radius of the annular core.

9. The recuperated engine of claim 8 wherein the remaining two sides of said plurality of inlet and outlet passageways converge radially inward.

10. The recuperated engine of claim 2 wherein said core section further comprises:

a plurality of support rings assembled into the annular core at the inner diameter of said disk plates.

11. The recuperated engine of claim 10 wherein said support rings within said core section are formed from a material having a different thermal coefficient of expansion than the material of said disk plates, and said support rings pre-stress the inner diameter of said disk plates.

12. The recuperated engine of claim 2 wherein said plates, said exhaust fin elements, and said fin elements within said Z-shaped finned passageways of said core section are formed stainless steel sheets and said formed stainless steel sheets are brazed together with a nickel chromium alloy.

13. The recuperated engine of claim 2 wherein said plates and said fin elements of said core section are silicon-based ceramics.

14. The recuperated engine of claim 2 wherein said plates, said exhaust fin elements, and said fin elements within said Z-shaped finned passageways of said core section are about 14 percent chromium, about 4 percent molydenum, and the remainder iron.

15. The recuperated engine of claim 1 wherein said means for allowing thermal growth comprises forming said inlet and outlet passageways in said plurality of plates such that said inlet and outlet passageways are generally triangular with radiused corners and one side of said generally triangular inlet and outlet passageways is generally aligned with the outer circumference of said disk plates, said one side additionally being curvallinear and having a radius less than the radius of said annular core.

16. The recuperated engine of claim 1 wherein said means for allowing thermal growth comprises:

a plurality of support rings assembled into said annular core at the inner diameter of said disk plates, said support rings within said annular core formed from a material having a different thermal coefficient of expansion than the material of said disk plates for pre-stressing the inner diameter of said disk plates.

17. The recuperated engine of claim 1 wherein said core section of said recuperator means further comprises
- a plurality of generally rectangular exhaust if elements, said exhaust fin elements disposed between alternate pairs of said stacked plurality of plates within the spaces defined by said paired adjacent inlet and outlet passageways;
- a plurality of fin elements defining generally Z-shaped fin passageways alternately stacked with respect to said exhaust fin elements between alternate pairs of said stacked plurality of plates;
- a first plurality of openings within said ridges bordering said inlet passageways of said plates, said first openings communicating with said Z-shaped finned passageways between alternate pairs of said stacked plurality of plates to distribute air thereto; and
- a second plurality of openings within said ridges bordering said outlet passageways of said plates, said second openings communicating with said Z-shaped finned passageways between alternate pairs of said stacked plurality of plates to receive air therefrom.

* * * * *